US006829921B2

(12) United States Patent
Isobe et al.

(10) Patent No.: US 6,829,921 B2
(45) Date of Patent: Dec. 14, 2004

(54) ABNORMALITY DETECTING DEVICE FOR EVAPORATIVE FUEL PROCESSING SYSTEM

(75) Inventors: Takashi Isobe, Wako (JP); Satoshi Kiso, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 313 days.

(21) Appl. No.: 10/166,383

(22) Filed: Jun. 11, 2002

(65) Prior Publication Data

US 2002/0184938 A1 Dec. 12, 2002

(30) Foreign Application Priority Data

Jun. 12, 2001 (JP) ....................................... 2001-176732

(51) Int. Cl.[7] ................................................. G01M 3/04
(52) U.S. Cl. ....................................................... 73/49.7
(58) Field of Search ............................... 73/49.7, 118.1, 73/49.8, 40, 168

(56) References Cited

U.S. PATENT DOCUMENTS 5,739,421 A * 4/1998 Iochi et al. .................. 73/49.7
6,227,037 B1 * 5/2001 Kawamura et al. .......... 73/49.7
6,487,892 B1 * 12/2002 Ito et al. ...................... 73/49.2

FOREIGN PATENT DOCUMENTS

JP 2857656 12/1998

* cited by examiner

*Primary Examiner*—Robert Raevis
(74) *Attorney, Agent, or Firm*—Arent Fox PLLC

(57) ABSTRACT

An abnormality detecting device for an evaporative fuel processing system is disclosed. The evaporative fuel processing system includes a fuel tank, a canister for trapping evaporative fuel generated in the fuel tank, a charging passage for connecting the fuel tank and the canister, a tank pressure regulating valve provided in the charging passage, a bypass passage bypassing the tank pressure regulating valve, a bypass valve provided in the bypass passage, and a pressure sensor provided in the fuel tank or in the charging passage at a position between the tank pressure regulating valve and the fuel tank. The pressure in the canister is reduced to a pressure which is lower than the atmospheric pressure in the condition where a valve closing command signal for the bypass valve is output. It is determined that the tank pressure regulating valve or the bypass valve is abnormal, when the pressure detected by the pressure sensor becomes equal to or less than a predetermined threshold during execution of the pressure reduction in the canister.

18 Claims, 7 Drawing Sheets

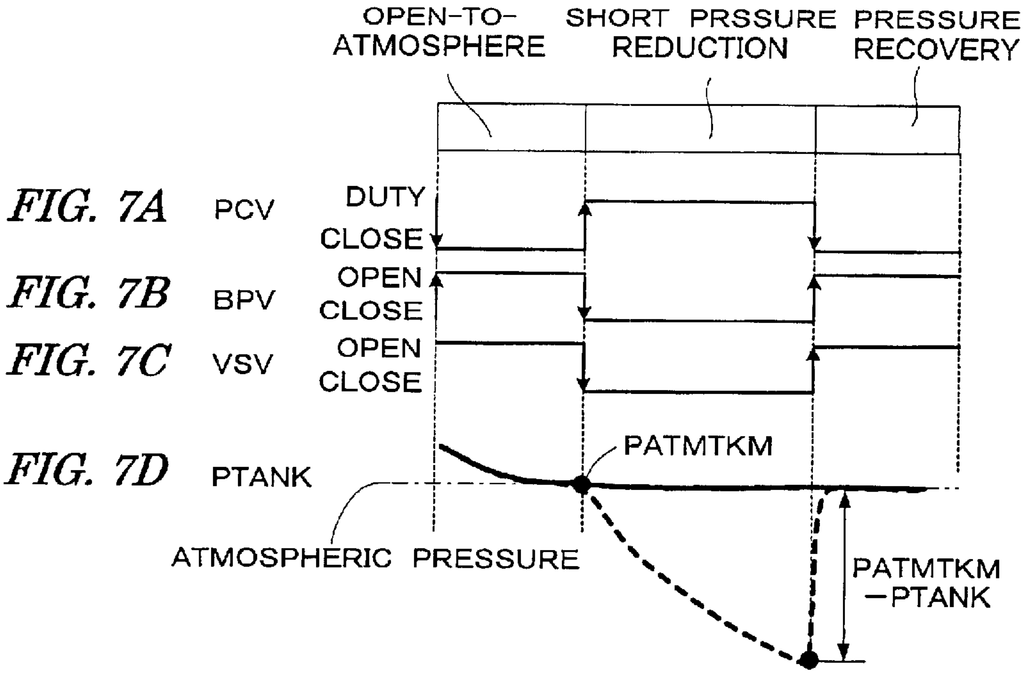
FIG. 7A
FIG. 7B
FIG. 7C
FIG. 7D
FIG. 8
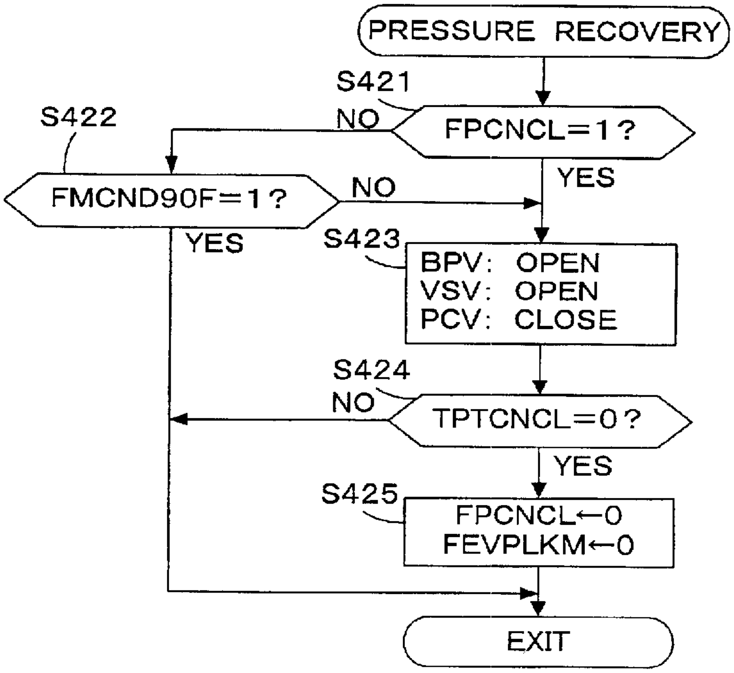

ABNORMALITY DETECTING DEVICE FOR EVAPORATIVE FUEL PROCESSING SYSTEM

BACKGROUND OF THE INVENTION

The present invention relates to an abnormality detecting device for an evaporative fuel processing system for processing evaporative fuel generated in a fuel tank containing fuel to be supplied to an internal combustion engine.

An abnormality detecting device for determining an abnormality in an evaporative fuel processing system is known from Japanese Patent No. 2857656, for example. In this conventional abnormality detecting device, a negative pressure (a pressure lower than the atmospheric pressure) generated in an intake pipe of an internal combustion engine is introduced into the evaporative fuel processing system to reduce the pressure in the evaporative fuel processing system, and the abnormality in the evaporative fuel processing system is determined according to the pressure in this system after the above pressure reduction. The evaporative fuel processing system includes a fuel tank, a canister for temporarily storing evaporative fuel generated in the fuel tank, and a charging passage for connecting the fuel tank and the canister.

According to the above abnormality detecting device, a leak in the fuel tank or the canister can be detected. However, the failure of an on-off valve provided in the charging passage cannot be detected.

SUMMARY OF THE INVENTION

It is accordingly an object of the present invention to provide an abnormality detecting device for an evaporative fuel processing system, which can detect the failure of the on-off valve provided in the charging passage for connecting the fuel tank and the canister.

In order to attain the above object, the present invention provides an abnormality detecting device for an evaporative fuel processing system. The evaporative fuel processing system includes a fuel tank (9), a canister (33) for trapping evaporative fuel generated in the fuel tank (9), a charging passage (31) for connecting the fuel tank (9) and the canister (33), a tank pressure regulating valve (35) provided in the charging passage (31), a bypass passage (31*a*) bypassing the tank pressure regulating valve (35), a bypass valve (36) provided in the bypass passage (31*a*), and a pressure sensor (15) provided in the fuel tank (9) or in the charging passage (31) at a position between the tank pressure regulating valve (35) and the fuel tank (9). The abnormality detecting device includes pressure reducing means and diagnosing means. The pressure reducing means reduces a pressure in the canister (33) to a pressure which is lower than the atmospheric pressure in the condition where a valve closing command signal for the bypass valve (36) is output. The diagnosing means determines that the tank pressure regulating valve (35) or the bypass valve (36) is abnormal when the pressure detected by the pressure sensor (15) becomes equal to or less than a predetermined threshold (the atmospheric pressure PA—DBPSOPN) during execution of the pressure reduction by the pressure reducing means.

With this configuration, the pressure in the canister is reduced in the condition where the valve closing command signal for the bypass valve is output, and when the pressure detected by the pressure sensor becomes equal to or less than the predetermined threshold during this pressure reduction, it is determined that the tank pressure regulating valve or the bypass valve is abnormal. If the bypass valve is normally closed in the condition where the valve closing command signal for the bypass valve is output, and the tank pressure regulating valve is normal, the pressure reduction in the canister has no influence on the pressure sensor output. In other words, if the pressure detected by the pressure sensor becomes equal to or less than the predetermined threshold during the pressure reduction in the canister, the tank pressure regulating valve or the bypass valve remains open. Accordingly, when the pressure detected by the pressure sensor becomes equal to or less than the predetermined threshold during the pressure reduction in the canister, it can be determined that the tank pressure regulating valve or the bypass valve is abnormal.

Preferably, the tank pressure regulating valve (35) includes a positive-pressure valve opened when the pressure in the fuel tank (9) is higher than the atmospheric pressure by a first predetermined pressure or more, and a negative-pressure valve opened when the pressure in the fuel tank (9) is lower than the pressure in the canister (33) by a second predetermined pressure or more. The diagnosing means preferably determines that the bypass valve (36) has failed or that the tank pressure regulating valve (35) has been improperly mounted, when the pressure (PTANK) detected by the pressure sensor (15) becomes equal to or less than the predetermined threshold (PA—DPBSOPN) during execution of the pressure reduction by the pressure reducing means.

With this configuration, in the case where the tank pressure regulating valve is a two-way valve including a positive-pressure valve and a negative-pressure valve, it is determined that the bypass valve has failed or that the tank pressure regulating valve has been improperly mounted, when the pressure detected by the pressure sensor becomes equal to or less than the predetermined threshold during the pressure reduction in the canister. That is, if a first port of the tank pressure regulating valve to be connected to the fuel tank is improperly connected to the canister, and a second port of the tank pressure regulating valve to be connected to the canister is improperly connected to the fuel tank, the negative-pressure valve opens due to the pressure reduction in the canister, resulting in a reduction in the pressure sensor output. Accordingly, when the pressure sensor output becomes equal to or less than the predetermined threshold during the pressure reduction in the canister, it can be determined that the tank pressure regulating valve has been improperly mounted or that the bypass valve has failed.

Preferably, the diagnosing means executes the determination when a predetermined waiting period (TSDEC1) has elapsed from the time of starting the pressure reduction by the pressure reducing means.

Preferably, the predetermined threshold is set to a value which is lower than the atmospheric pressure by a predetermined determination pressure.

Preferably, the diagnosing means determines that the tank pressure regulating valve (35) or the bypass valve (36) is abnormal, when the condition where the pressure (PTANK)

detected by the pressure sensor (15) is less than or equal to the predetermined threshold (PA—DPBSOPN) continues for a predetermined determination period (CBPSCHK).

The present invention further provides an abnormality detecting device for an evaporative fuel processing system. The evaporative fuel processing system includes a fuel tank (9), a canister (33) for trapping evaporative fuel generated in the fuel tank (9), a charging passage (31) for connecting the fuel tank (9) and the canister (33), an on-off valve (36) provided in the charging passage (31) for opening and closing the charging passage (31), and a pressure sensor (15) provided in the fuel tank (9) or in the charging passage (31) at a position between the on-off valve (36) and the fuel tank (9). The abnormality detecting device includes pressure reducing means and diagnosing means. The pressure reducing means reduces a pressure in the canister (33) to a pressure which is lower than the atmospheric pressure in the condition where a valve closing command signal for the on-off valve (36) is output. The diagnosing means determines that the on-off valve (36) has failed, when the pressure (PTANK) detected by the pressure sensor (15) becomes equal to or less than a predetermined threshold (PA—DPBSOPN) during execution of the pressure reduction by the pressure reducing means.

With this configuration, the pressure in the canister is reduced in the condition where the valve closing command signal for the on-off valve is output, and when the pressure detected by the pressure sensor becomes equal to or less than the predetermined threshold during this pressure reduction, it is determined that the on-off valve has failed. If the on-off valve is normally closed in the condition where the valve closing command signal for the on-off valve is output, the pressure reduction in the canister has no influence on the pressure sensor output. In other words, if the pressure detected by the pressure sensor becomes equal to or less than the predetermined threshold during the pressure reduction in the canister, it is determined that a valve opening failure of the on-off valve has occurred such that the on-off valve is not closed in spite of supplying the valve closing command signal to the on-off valve. Accordingly, such a valve opening failure of the on-off valve can be detected.

BRIEF DESCRIPTION OF THE DRAWINGS

FIGS. 7A to 7D are time charts for illustrating an abnormality diagnosis method by the process of FIG. 6.

FIG. 8 is a flowchart of a pressure recovery process.

DETAILED DESCRIPTION OF THE PREFERRED EMBODIMENTS

A preferred embodiment of the present invention will now be described with reference to the drawings.

Figure 1:
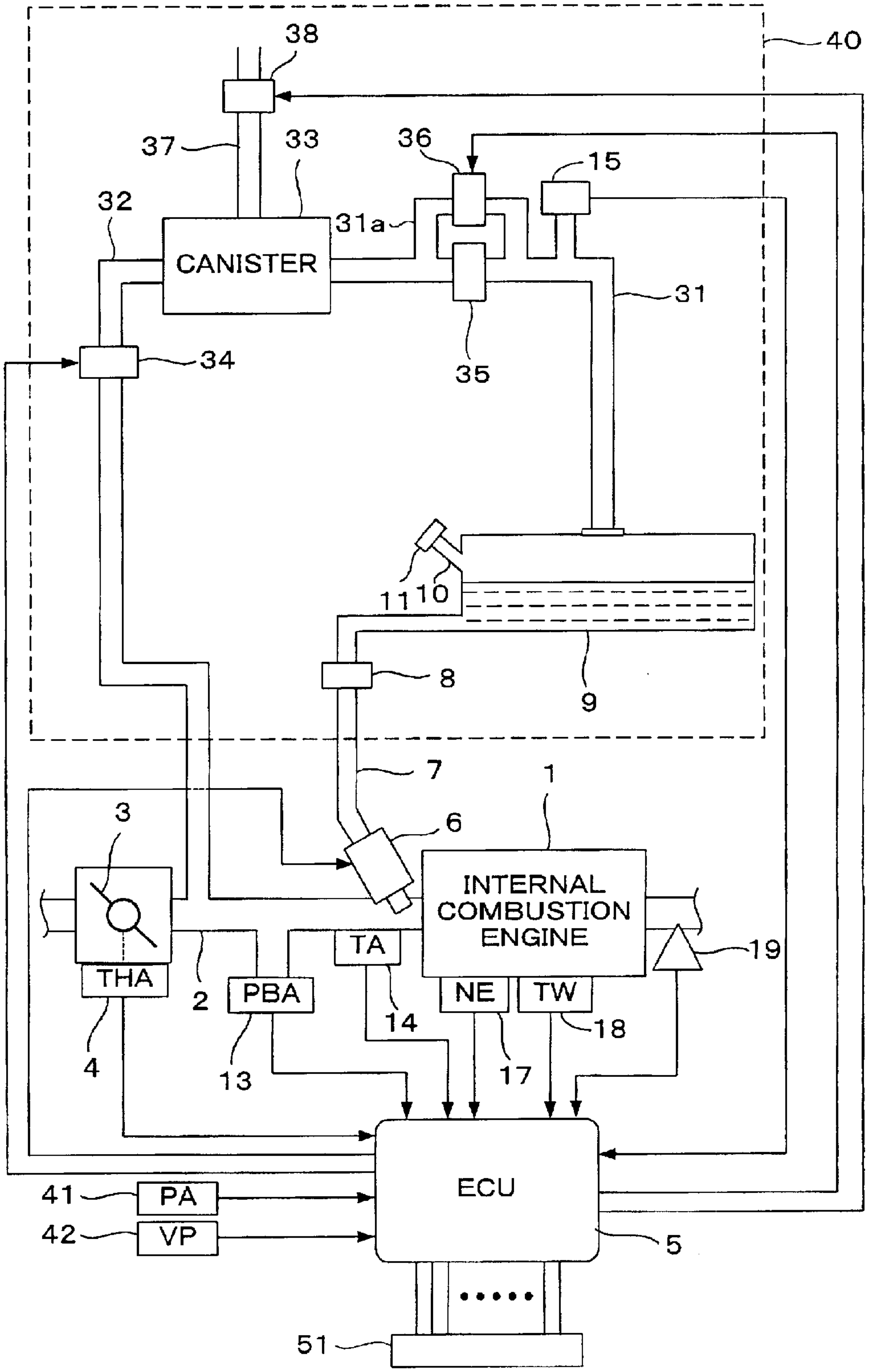
FIG. 1 is a schematic diagram showing the configuration of an evaporative fuel processing system and a control system for an internal combustion engine according to a preferred embodiment of the present invention.

FIG. 1 is a schematic diagram showing the configuration of an evaporative fuel processing system and a control system for an internal combustion engine according to a preferred embodiment of the present invention. Referring to FIG. 1, reference numeral 1 denotes an internal combustion engine (which will be hereinafter referred to simply as "engine") having a plurality of (e.g., four) cylinders. The engine 1 is provided with an intake pipe 2, in which a throttle valve 3 is mounted. A throttle valve opening (THA) sensor 4 is connected to the throttle valve 3. The throttle valve opening sensor 4 outputs an electrical signal corresponding to the opening angle of the throttle valve 3 and supplies the electrical signal to an electronic control unit (which will be hereinafter referred to as "ECU") 5 for controlling the engine 1.

Fuel injection valves 6, only one of which is shown, are inserted into the intake pipe 2 at locations intermediate between the cylinder block of the engine 1 and the throttle valve 3 and slightly upstream of the respective intake valves (not shown). The fuel injection valves 6 are connected via a fuel supply pipe 7 to a fuel tank 9. The fuel supply pipe 7 is provided with a fuel pump 8. The fuel tank 9 has a fuel inlet 10 for use in refueling, and a filler cap 11 is mounted on the fuel inlet 10.

Each fuel injection valve 6 is electrically connected to the ECU 5, and its valve opening period is controlled by a signal from the ECU 5. The intake pipe 2 is provided with an intake pipe absolute pressure (PBA) sensor 13 for detecting an absolute pressure PBA in the intake pipe 2 and an intake air temperature (TA) sensor 14 for detecting an air temperature TA (ambient temperature) in the intake pipe 2 at positions downstream of the throttle valve 3.

An engine rotational speed (NE) sensor 17 for detecting an engine rotational speed is disposed near the outer periphery of a camshaft or a crankshaft (both not shown) of the engine 1. The engine rotational speed sensor 17 outputs a pulse (TDC signal pulse) at a given crank angle per 180° rotation of the crankshaft of the engine 1. There are also provided an engine coolant temperature sensor 18 for detecting a coolant temperature TW of the engine 1 and an oxygen concentration sensor (which will be hereinafter referred to as "LAF sensor") 19 for detecting an oxygen concentration in exhaust gases from the engine 1. Detection signals from these sensors 13 to 19 are supplied to the ECU 5. The LAF sensor 19 functions as a wide-region air-fuel ratio sensor which outputs a signal substantially proportional to an oxygen concentration in exhaust gases (proportional to an air-fuel ratio of air-fuel mixture supplied to the engine 1).

An atmospheric pressure sensor 41 for detecting an atmospheric pressure PA and a vehicle speed sensor 42 for detecting a running speed (vehicle speed) VP of a vehicle on which the engine 1 is mounted are also connected to the ECU 5, and detection signals from these sensors 41 and 42 are supplied to the ECU 5.

The fuel tank 9 is connected through a charging passage 31 to a canister 33. The canister 33 is connected through a purging passage 32 to the intake pipe 2 at a position downstream of the throttle valve 3.

The charging passage 31 is provided with a two-way valve 35. The two-way valve 35 consists of a positive-pressure valve and a negative pressure valve. The positive pressure valve opens when the pressure in the fuel tank 9 is higher than the atmospheric pressure by a first predetermined pressure (e.g., 2.7 kPa (20 mmHg)) or more. The negative-pressure valve opens when the pressure in the fuel tank 9 is lower than the pressure in the canister 33 by a second predetermined pressure or more.

The charging passage 31 is branched to form a bypass passage 31 a bypassing the two-way valve 35. The bypass passage 31 a is provided with a bypass valve (on-off valve) 36. The bypass valve 36 is a normally closed solenoid valve, which is opened and closed during execution of abnormality diagnosis to be hereinafter described. The operation of the bypass valve 36 is controlled by the ECU 5.

The charging passage 31 is further provided with a pressure sensor 15 at a position between the two-way valve 35 and the fuel tank 9. A detection signal output from the pressure sensor 15 is supplied to the ECU 5. The output PTANK from the pressure sensor 15 takes a value equal to the pressure in the fuel tank 9 (the pressure detected by the pressure sensor 15 will be hereinafter referred to as "tank pressure") in a steady state where the pressures in the canister 33 and in the fuel tank 9 are stable. On the other hand, the tank pressure PTANK takes a value which is different from the actual tank pressure in a transient state where the pressure in the fuel tank 9 is being reduced, for example.

The canister 33 contains active carbon for adsorbing the evaporative fuel in the fuel tank 9. The canister 33 communicates with the atmosphere through a vent passage 37.

The vent passage 37 is provided with a vent shut valve (on-off valve) 38. The vent shut valve 38 is a solenoid valve, and its operation is controlled by the ECU 5. The vent shut valve 38 is opened in refueling or during purging of evaporative fuel from the canister 33 to the intake pipe 2. Further, the vent shut valve 38 is opened and closed during execution of the abnormality diagnosis to be hereinafter described.

The purging passage 32 connected between the canister 33 and the intake pipe 2 is provided with a purge control valve 34. The purge control valve 34 is a solenoid valve whose opening degree can be continuously controlled by changing the on-off duty ratio of a control signal. The control signal of the purge control valve 34 is supplied from the ECU 5, and the operation of the purge control valve 34 is controlled by the ECU 5.

The fuel tank 9, the charging passage 31, the bypass passage 31*a*, the canister 33, the purging passage 32, the two-way valve 35, the bypass valve 36, the purge control valve 34, the vent passage 37, and the vent shut valve 38 constitutes an evaporative fuel processing system 40.

When a large amount of evaporative fuel is generated in refueling into the fuel tank 9, the two-way valve 35 opens to make the canister 33 store (trap) the evaporative fuel. In a predetermined operating condition of the engine 1, the duty control of the purge control valve 34 is performed to supply a suitable amount of evaporative fuel from the canister 33 to the intake pipe 2.

The ECU 5 includes an input circuit having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU"), a memory circuit preliminarily storing various operational programs to be executed by the CPU and for storing the results of computation or the like by the CPU, and an output circuit for supplying drive signals to the fuel injection valves 6, the purge control valve 34, the bypass valve 36, and the vent shut valve 38.

For example, the CPU of the ECU 5 controls the amount of fuel to be supplied to the engine 1 and the duty control of the purge control valve 34 according to output signals from the various sensors including the engine rotational speed sensor 17, the intake pipe absolute pressure sensor 13, and the engine coolant temperature sensor 18.

Figure 2:
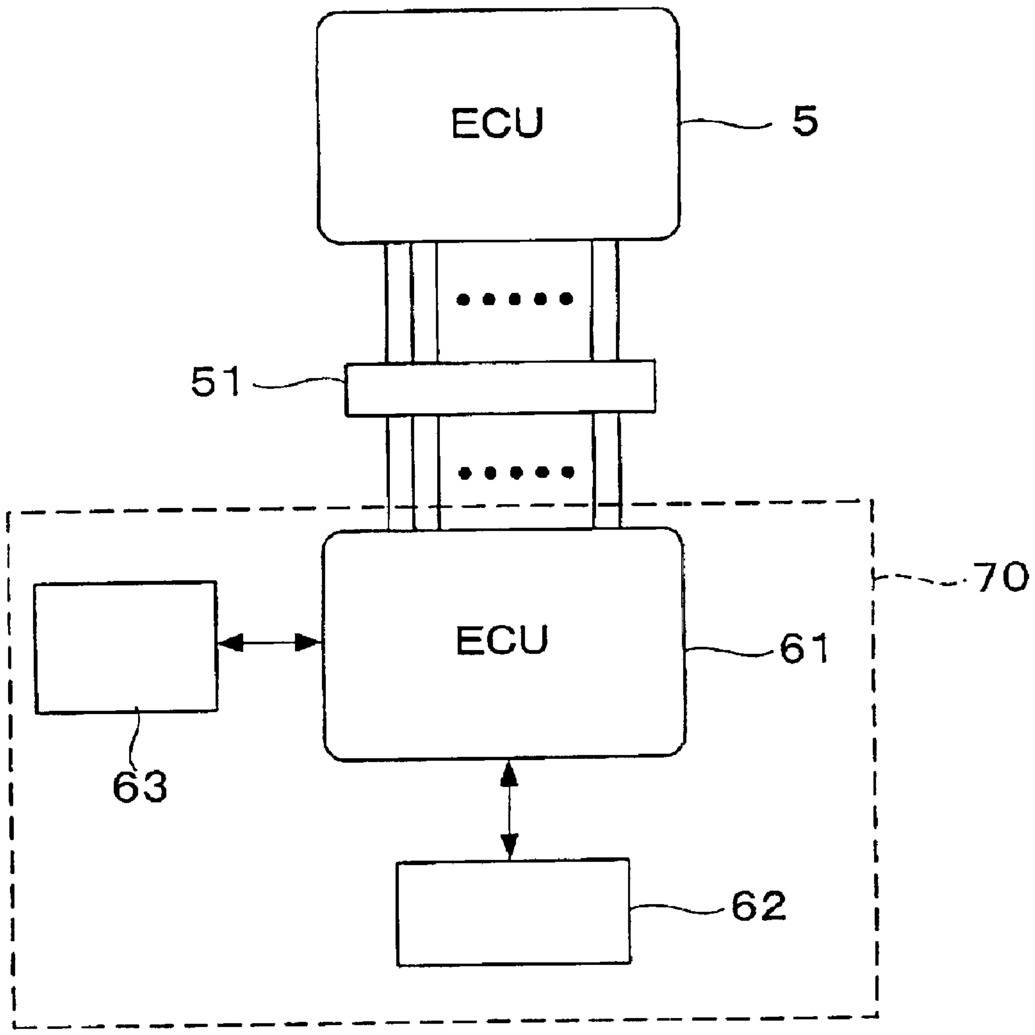
FIG. 2 is a schematic diagram showing the configuration of an external abnormality diagnosis apparatus and illustrating the connection of the external abnormality diagnosis apparatus and the control system for the internal combustion engine shown in FIG. 1.

The ECU 5 is connected to a connector 51. As shown in FIG. 2, the ECU 5 is connectable through the connector 51 to an external abnormality diagnosis apparatus 70. The abnormality diagnosis apparatus 70 includes an electronic control unit 61 for executing abnormality diagnosis (this control unit will be hereinafter referred to as "abnormality diagnosis ECU"), an input section 62 for inputting necessary information from an operator and instructing the ECU 5 to execute the abnormality diagnosis, and a display section 63 for displaying the result of the abnormality diagnosis. The abnormality diagnosis ECU 61 includes a central processing unit (CPU), a memory circuit preliminarily storing various operational programs to be executed by the CPU and for storing the results of computation or the like by the CPU, and an interface circuit for exchanging information between the abnormality diagnosis ECU 61 and the engine control ECU 5.

In executing the abnormality diagnosis, the abnormality diagnosis ECU 61 is connected through the connector 51 to the engine control ECU 5 to supply drive command signals for the bypass valve 36, the purge control valve 34, and the vent shut valve 38 to the engine control ECU 5. The engine control ECU 5 supplies detection signals from the various sensors to the abnormality diagnosis ECU 61. Accordingly, the abnormality diagnosis for the evaporative fuel processing system 40 can be executed by the external abnormality diagnosis apparatus 70 through the ECU 5.

Figure 3:
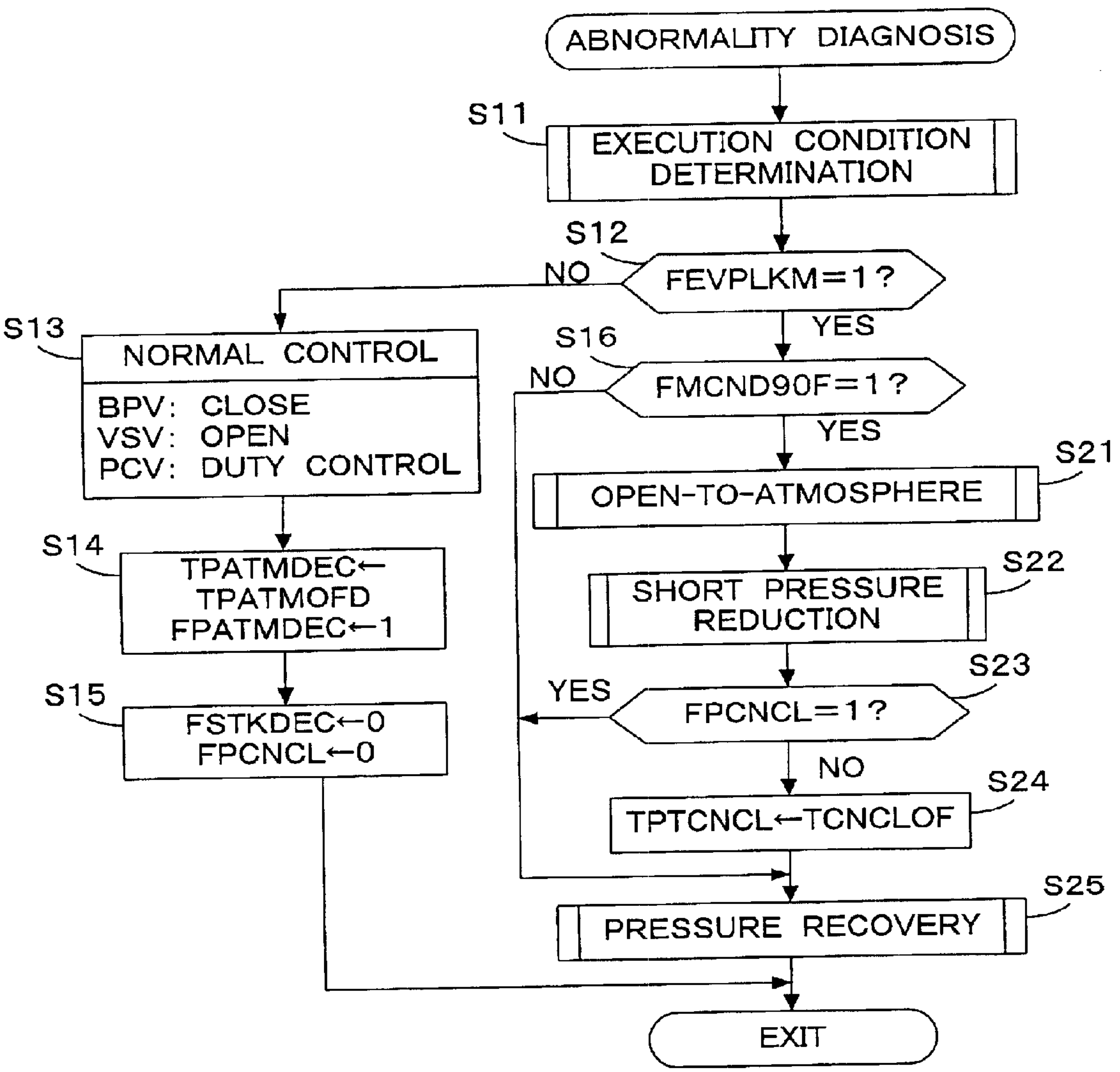
FIG. 3 is a flowchart of an abnormality diagnosis process.

FIG. 3 is a flowchart showing a program for executing the abnormality diagnosis by the external abnormality diagnosis apparatus 70. This program is executed by the CPU of the abnormality diagnosis ECU 61 at predetermined time periods (e.g., 80 msec).

Figure 4:
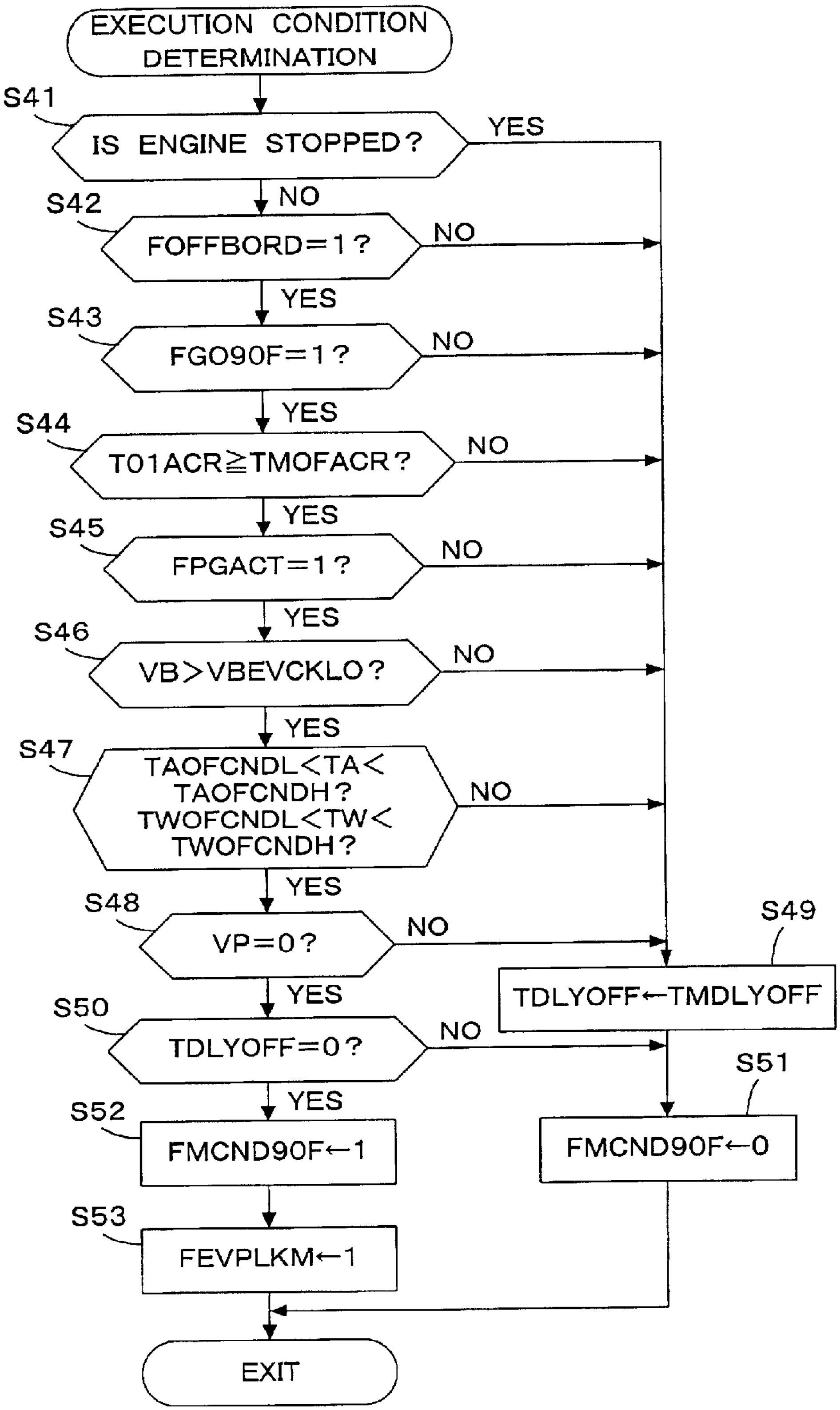
FIG. 4 is a flowchart showing a process for determining an execution condition of the abnormality diagnosis.

In step S11, the execution condition determination process shown in FIG. 4 is executed. When the execution condition of the abnormality diagnosis is satisfied, a monitor execution flag FEVPLKM and an execution condition flag FMCND90F are both set to "1". When the execution condition becomes dissatisfied after the execution condition is once satisfied, the execution condition flag FMCND90F is returned to "0", but the monitor execution flag FEVPLKM is maintained at "1" until the pressure recovery process shown in FIG. 8 is completed.

In step S12, it is determined whether or not the monitor execution flag FEVPLKM is "1". If FEVPLKM is "0", normal control is executed (step S13). That is, a valve closing command signal for the bypass valve (BPV) 36, a valve opening command signal for the vent shut valve (VSV) 38, and a duty control signal for the purge control valve (PCV) 34 are output. Thereafter, a downcount timer TPATMDEC, which is referred to in the open-to-atmosphere process (step S21 and FIG. 5) described below, is set to a predetermined time period TPATMOFD (e.g., 30 sec) and then started (step S14). Further in step S14, a open-to-atmosphere flag FPATMDEC is set to "1". When the open-to-atmosphere flag FPATMDEC is set to "1", the open-to-atmosphere process is executed.

Figure 6:
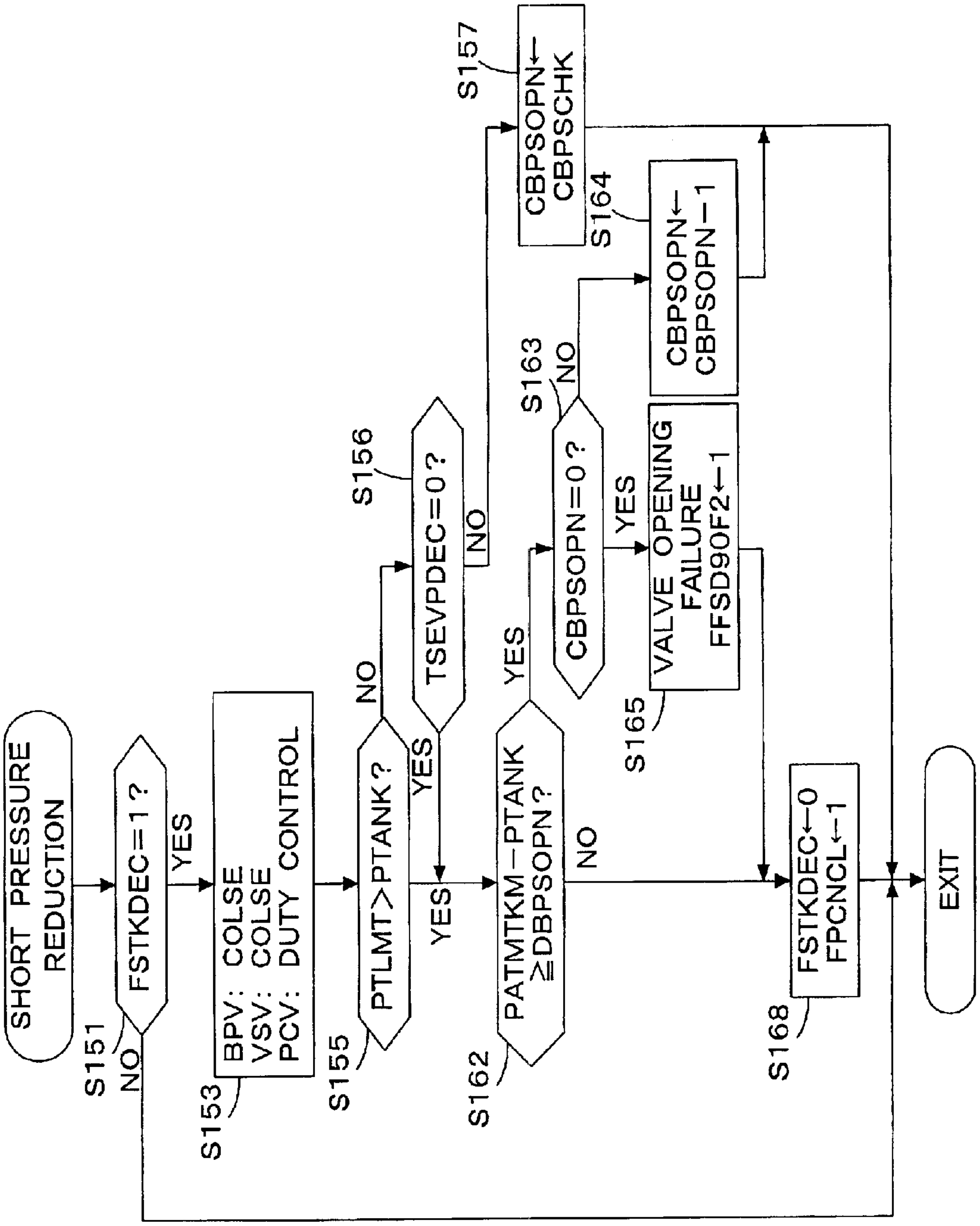
FIG. 6 is a flowchart of a short pressure reduction process.

In step S15, a short pressure reduction flag FSTKDEC and a pressure recovery flag FPCNCL are both set to "0", and this program ends. When the short pressure reduction flag FSTKDEC is set to "1", the short pressure reduction process shown in FIG. 6 is executed. When the pressure recovery flag FPCNCL is set to "1", the pressure recovery process shown in FIG. 8 is executed.

When the monitor execution flag FEVPLKM is set to "1", the program proceeds from step S12 to step S16, in which it is determined whether or not the execution condition flag FMCND90F is "1". Since the answer to step S16 is normally affirmative (YES), the program proceeds to step S21, in which the open-to-atmosphere process is executed. Thereafter, the short pressure reduction process shown in FIG. 6 is executed (step S22), and it is determined whether or not the pressure recovery flag FPCNCL is "1" (step S23). The pressure recovery flag FPCNCL is set to "1" at the time the short pressure reduction process is completed in step S22. If the answer to step S23 is negative (NO), a downcount timer TPTCNCL, which is referred to in the pressure recovery process of step S25, is set to a predetermined time period TCNCLOF (e.g., 10 sec) and then started (step S24), and the program proceeds to step S25. When the pressure recovery flag FPCNCL is set to "1", the program proceeds from step S23 directly to step S25.

In step S25, the pressure recovery process shown in FIG. 8 is executed. Thereafter, this program ends.

When the execution condition of the abnormality diagnosis becomes dissatisfied, the execution condition flag FMCND90F is returned to "0", but the monitor execution flag FEVPLKM is maintained at "1". Accordingly, the program proceeds from step S12 through step S16 to step S25 to execute the pressure recovery process. After completing the pressure recovery process, the monitor execution flag FEVPLKM is returned to "0" to restore the normal control.

FIG. 4 is a flowchart showing the execution condition determination process executed in step S11 shown in FIG. 3.

In step S41, it is determined whether or not the engine 1 is stopped. If the engine 1 is stopped, it is determined that the execution condition is not satisfied, and a downcount timer TDLYOFF, which is referred to in step S50, is set to a predetermined time period TMDLYOFF (e.g., 5 sec) and then started (step S49). Thereafter, the execution condition flag FMCND90F is set to "0" (step S51), and this process ends.

If the engine 1 is in operation, it is determined whether or not a diagnosis permission flag FOFFBORD is "1" (step S42). The flag FOFFBORD is set to "1" when the abnormality diagnosis by the external abnormality diagnosis apparatus 70 is permitted by other process (not shown).

If FOFFBORD is "1", it is determined whether or not a diagnosis execution command flag FGO90F is "1" (step S43). The flag FGO90F is set to "1" when the execution of the abnormality diagnosis is commanded by another process not shown.

If FGO90F is "1", it is determined whether or not the value of an upcount timer TO1ACR for measuring the time after completion of starting of the engine 1 is greater than or equal to a predetermined time period TMOFACR (e.g., 10 sec) (step S44).

If TO1ACR is greater than or equal to TMOFACR, it is determined whether or not a purge permission flag FPGACT is "1" (step S45). The flag FPGACT is set to "1" when it is permitted to purge the evaporative fuel stored in the canister 33 to the intake pipe 2.

If FPGACT is "1", it is determined whether or not a battery voltage VB is higher than a predetermined voltage VBEVCKLO (e.g., 8 V) (step S46). If VB is greater than VBEVCKLO, it is determined whether or not the intake air temperature TA is in a range between a predetermined upper limit TAOFCNDH (e.g., 100° C.) and a predetermined lower limit TAOFCNDL (e.g., 0° C.), and it is also determined whether or not the engine coolant temperature TW is in a range between a predetermined upper limit TWOFCNDH (e.g., 100° C.) and a predetermined lower limit TWOFCNDL (e.g., 0° C.) (step S47).

If the intake air temperature TA is in the range between TAOFCNDL and TAOFCNDH, and the engine coolant temperature TW is in the range between TWOFCNDL and TWOFCNDH, it is determined whether or not the vehicle speed VP is "0" (step S48).

If the answer to any one of steps S42 to S48 is negative (NO), it is determined that the execution condition is not satisfied, and the program proceeds to step S49. If the answers to all of steps S42 to S48 are affirmative (YES), it is determined whether or not the value of the timer TDLYOFF started in step S49 is "0" (step S50). If TDLYOFF is greater than "0", the program proceeds to step S51. If TDLYOFF is "0", it is determined that the execution condition is satisfied, so that the execution condition flag FMCND90F is set to "1" (step S52) and the monitor execution flag FEVPLKM is set to "1" (step S53). Then, this process ends.

Figure 5:
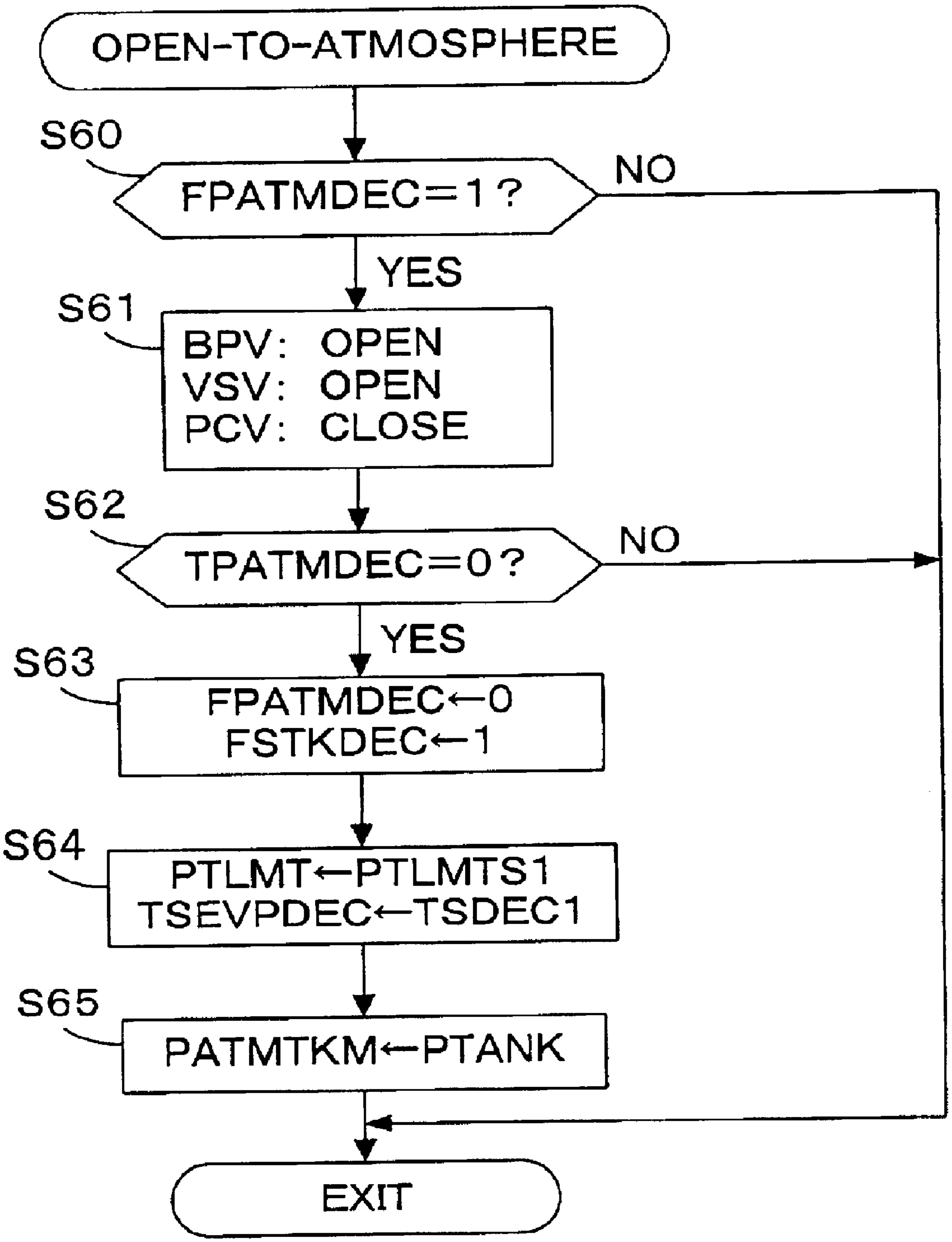
FIG. 5 is a flowchart of an open-to-atmosphere process.

FIG. 5 is a flowchart showing the open-to-atmosphere process executed in step S21 shown in FIG. 3.

In step S60, it is determined whether or not the open-to-atmosphere flag FPATMDEC is "1". Initially, the flag FPATMDEC is "1". Accordingly, the program proceeds to step S61 to output a valve opening command signal for the bypass valve 36, a valve opening command signal for the vent shut valve 38, and a valve closing command signal for the purge control valve 34. In step S62, it is determined whether or not the value of the timer TPATMDEC started in step S14 shown in FIG. 3 is "0". Initially, TPATMDEC is greater than "0", so that this process ends immediately.

If TPATMDEC is "0" in step S62, the open-to-atmosphere flag FPATMDEC is set to "0" and the short pressure reduction flag FSTKDEC is set to "1" (step S63). By setting the open-to-atmosphere flag FPATMDEC to "0", the answer to step S60 in the subsequent executions becomes negative (NO), so that the open-to-atmosphere process is not substantially executed.

In step S64, a predetermined limit pressure PTLMT, which is referred to in the short pressure reduction process, is set to a predetermined value PTLMTS1 (e.g., a pressure value which is lower than the atmospheric pressure by about 6 kPa (45 mmHg)). Further, a downcount timer TSEVPDEC, which is referred to in the short pressure reduction process, is set to a predetermined time period TSDEC1 (e.g., about 3 to 5 sec) and then started. Thereafter, a present output PTANK from the pressure sensor 15 is stored as a memory value PATMTKM (step S65), and this process ends.

FIG. 6 is a flowchart showing the short pressure reduction process executed in step S22 shown in FIG. 3.

In step S151, it is determined whether or not the short pressure reduction flag FSTKDEC is "1". If FSTKDEC is "0", this process ends immediately. That is, the short pressure reduction process is substantially executed when the short pressure reduction flag FSTKDEC is set to "1".

When the short pressure reduction flag FSTKDEC is set to "1" in step S63 shown in FIG. 5, the program proceeds from step S151 to step S153 to output a valve closing command signal for the bypass valve 36, a valve closing command signal for the vent shut valve 38, and a duty control signal (constant duty ratio) for the purge control valve 34. Accordingly, the negative pressure in the intake pipe 2 is introduced into the evaporative fuel processing system 40. Since the valve closing command signals for the bypass valve 36 and the vent shut valve 38 are output, the pressure in the canister 33 is reduced as far as these valves 36 and 38 are normally (properly) operated.

In step S155, it is determined whether or not the pressure sensor output PTANK is lower than the predetermined limit pressure PTLMT. Normally, the answer to step S155 is negative (NO), so that the program proceeds to step S156 to determine whether or not the value of the downcount timer TSEVPDEC is "0". Initially, TSEVPDEC is greater than "0", so that a downcounter CBPSOPN is set to a predetermined value CBPSCHK (e.g., 2) (step S157), and this process ends.

If PTANK is less than PTLMT or TSEVPDEC is "0", the program proceeds to step S162 to determine whether or not the difference (PATMTKM—PTANK) between the memory value PATMTKM stored in step S65 shown in FIG. 5 and the pressure sensor output PTANK, is greater than or equal to a predetermined pressure difference DBPSOPN (e.g., 0.67 kPa (5 mmHg)). If the answer to step S162 is negative (NO), this indicates that the pressure PTANK detected by the pressure sensor 15 has not decreased. Accordingly, it is determined that the bypass valve 36 is normally (properly) closed and no valve opening failure has occurred in the two-way valve 35. Then, the program proceeds to step S168.

In step S168, the short pressure reduction flag FSTKDEC is returned to "0" and the pressure recovery flag FPCNCL is set to "1". Then, this process ends.

If the answer to step S162 is affirmative (YES), that is, if the pressure sensor output PTANK has decreased by a value which is equal to or greater than the predetermined pressure difference DBPSOPN in the short pressure reduction process, it is determined whether or not the value of the counter CBPSOPN is "0" (step S163). Initially, CBPSOPN is greater than "0", so that the value of the counter CBPSOPN is decremented by "1" (step S164), and this process ends.

If the condition where the pressure difference (PATMTKM—PTANK) is greater than or equal to DBPSOPN continues and the value of the counter CBPSOPN becomes "0", it is determined that a valve opening failure has occurred in the bypass valve 36 or the two-way valve 35 (i.e., the bypass valve 36 or the two-way valve 35 is in an abnormal condition where it remains open and does not close) or that the two-way valve 35 is improperly mounted. In this case, a valve opening abnormality flag FFSD90F2 is set to "1" (step S165), and the program proceeds to step S168.

In the case that the two-way valve 35 is properly mounted, the positive-pressure valve in the two-way valve 35 opens when the pressure in the fuel tank 9 is higher than the atmospheric pressure by the first predetermined pressure or more, and the negative-pressure valve in the two-way valve 35 opens when the pressure in the fuel tank 9 is lower than the pressure in the canister 33 by the second predetermined pressure or more. Accordingly, the two-way valve 35 in its properly mounted condition does not open during the short pressure reduction process. However, if the two-way valve 35 is reversely mounted by mistake, that is, if a port of the two-way valve 35 to be connected to the fuel tank 9 is improperly connected to the canister 33 and the other port of the two-way valve 35 to be connected to the canister 33 is improperly connected to the fuel tank 9, the negative-pressure valve opens in the short pressure reduction process. Accordingly, such a possibility of improper mounting of the two-way valve 35 is considered.

FIGS. 7A to 7D are time charts for illustrating the abnormality determination in the short pressure reduction process. When both the bypass valve 36 and the two-way valve 35 are normal, the pressure sensor output PTANK is kept near the memory value PATMTKM and does not decrease as shown by the solid line in FIG. 7D. In the case of the valve opening failure of the bypass valve 36 or the two-way valve 35, or the improper mounting of the two-way valve 35, the pressure sensor output PTANK decreases as shown by the broken line in FIG. 7D, thereby detecting the abnormality of the valve 35 or 36.

FIG. 8 is a flowchart showing the pressure recovery process executed in step S25 shown in FIG. 3.

In step S421, it is determined whether or not the pressure recovery flag FPCNCL is "1". If FPCNCL is "0", it is determined whether or not the execution condition flag FMCND90F is "1". If FMCND90F is "1", which indicates that the execution condition of the abnormality diagnosis is satisfied, this process ends immediately. On the other hand, if the pressure recovery flag FPCNCL is "1" or the execution condition is not satisfied (FMCND90F=0), the program proceeds to step S423 to output a valve opening command signal for the bypass valve 36, a valve opening command signal for the vent shut valve 38, and a valve closing command signal for the purge control valve 34.

Thereafter, it is determined whether or not the value of the timer TPTCNCL started in step S24 shown in FIG. 3 is "0" (step S424). Initially, TPTCNCL is greater than "0", so that this process ends immediately. If TPTCNCL is "0", both the pressure recovery flag FPCNCL and the monitor execution flag FEVPLKM are returned to "0" (step S425). As a result, the program of FIG. 3 proceeds from step S12 to step S13 to restore the normal control.

According to this preferred embodiment as mentioned above, the short pressure reduction process for reducing the pressure in the canister 33 to a pressure lower than the atmospheric pressure is executed in the condition where a valve closing command signal for the bypass valve 36 is output, and when the pressure difference (PATMTKM—PTANK) between the pressure PTANK detected by the pressure sensor 15 and the memory value PATMTKM becomes greater than or equal to the predetermined pressure difference DBPSOPN, it is determined that the valve opening failure of the two-way valve 35 or the bypass valve 36 has occurred, or the two-way valve 35 has been improperly mounted. Accordingly, the abnormality of the bypass valve 36 or the two-way valve 35 can be quickly detected.

The memory value PATMTKM is a pressure sensor output value after the open-to-atmosphere process, and this value is therefore substantially equal to the atmospheric pressure. Accordingly, the determination in step S162 shown in FIG. 6 is equivalent to the determination whether or not the pressure sensor output PTANK is less than or equal to a predetermined threshold that is defined as a pressure obtained by subtracting the predetermined pressure difference DBPSOPN from the atmospheric pressure PA.

In this preferred embodiment, the engine 1, the intake pipe 2, the purging passage 32, the purge control valve 34, the ECU 5, and the ECU 61 constitute the pressure reducing means, and the ECU 61 constitutes the diagnosing means. More specifically, step S63 in FIG. 5 and steps S153 and S156 in FIG. 6 correspond to a part of the pressure reducing means, and steps S162 to S165 in FIG. 6 correspond to the diagnosing means.

It should be noted that the present invention is not limited to the above preferred embodiment, but various modifications may be made. For example, in the above preferred embodiment, the two-way valve 35 is provided in the charging passage 31 and the bypass valve 36 is provided in the bypass passage 31 a bypassing the two-way valve 35. Alternatively, only an electromagnetic on-off valve similar to the bypass valve 36 may be provided in the charging passage 31 in place of the two-way valve 35. With this configuration, the duty control of the purge control valve 34 is performed in the condition where the electromagnetic on-off valve provided in the charging passage 31 and the vent shut valve 38 are closed, thereby introducing the negative pressure into the canister 33. During the pressure reduction, the abnormality diagnosis according to the pressure sensor output PTANK is executed like by a method similar to that of the above preferred embodiment.

Further, the above-mentioned abnormality diagnosis method is applicable also to an evaporative fuel processing system having two bypass passages bypassing a two-way valve, wherein each bypass passage is provided with an electromagnetic on-off valve, as described in Japanese Patent No. 2857656. With this configuration, the pressure in the canister is reduced in the condition where valve closing command signals for the two electromagnetic on-off valves (bypass valve and puff-loss valve) are output, and when the pressure detected by the pressure sensor becomes less than or equal to a predetermined threshold during this pressure reduction, it is determined that the two-way valve (tank pressure regulating valve) or at least one of the two on-off valves is abnormal.

Further, the abnormality diagnosis process (FIG. 3) may be executed by the CPU of the ECU 5 without using the external abnormality diagnosis apparatus 70.

Further, the pressure sensor 15 may be mounted in the fuel tank 9.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An abnormality detecting device for an evaporative fuel processing system including:

a fuel tank;

a canister for trapping evaporative fuel generated in said fuel tank;

a charging passage for connecting said fuel tank and said canister;

a tank pressure regulating valve provided in said charging passage;

a bypass passage bypassing said tank pressure regulating valve;

a bypass valve provided in said bypass passage;

and a pressure sensor provided in said fuel tank or in said charging passage at a position between said tank pressure regulating valve and said fuel tank, said abnormality detecting device comprising:

pressure reducing means for reducing a pressure in said canister to a pressure which is lower than an atmospheric pressure in the condition where a valve closing command signal for said bypass valve is output; and diagnosing means for determining that said tank pressure regulating valve or said bypass valve is abnormal when the pressure detected by said pressure sensor becomes equal to or less than a predetermined threshold during execution of the pressure reduction by said pressure reducing means.

2. An abnormality detecting device according to claim 1, wherein said tank pressure regulating valve comprises a positive-pressure valve which opens when the pressure in said fuel tank is higher than the atmospheric pressure by a first predetermined pressure or more, and a negative-pressure valve which opens when the pressure in said fuel tank is lower than the pressure in said canister by a second predetermined pressure or more; and said diagnosing means determines that said bypass valve has failed or that said tank pressure regulating valve has been improperly mounted, when the pressure detected by said pressure sensor becomes equal to or less than the predetermined threshold during execution of the pressure reduction by said pressure reducing means.

3. An abnormality detecting device according to claim 1, wherein said diagnosing means executes the determination when a predetermined waiting period has elapsed from the time of starting the pressure reduction by said pressure reducing means.

4. An abnormality detecting device according to claim 1, wherein the predetermined threshold is set to a value which is lower than the atmospheric pressure by a predetermined determination pressure.

5. An abnormality detecting device according to claim 1, wherein said diagnosing means determines that said tank pressure regulating valve or said bypass valve is abnormal, when the condition where the pressure detected by said pressure sensor is less than or equal to the predetermined threshold continues for a predetermined determination period.

6. An abnormality detecting device for an evaporative fuel processing system including:

a fuel tank;

a canister for trapping evaporative fuel generated in said fuel tank;

a charging passage for connecting said fuel tank and said canister;

an on-off valve provided in said charging passage for opening and closing said charging passage;

and a pressure sensor provided in said fuel tank or in said charging passage at a position between said on-off valve and said fuel tank, said abnormality detecting device comprising:

pressure reducing means for reducing a pressure in said canister to a pressure which is lower than an atmospheric pressure in the condition where a valve closing command signal for said on-off valve is output; and diagnosing means for determining that said on-off valve has failed, when the pressure detected by said pressure sensor becomes equal to or less than a predetermined threshold during execution of the pressure reduction by said pressure reducing means.

7. An abnormality detecting device for an evaporative fuel processing system including:

a fuel tank;

a canister for trapping evaporative fuel generated in said fuel tank;

a charging passage for connecting said fuel tank and said canister;

a tank pressure regulating valve provided in said charging passage;

a bypass passage bypassing said tank pressure regulating valve;

a bypass valve provided in said bypass passage;

and a pressure sensor provided in said fuel tank or in said charging passage at a position between said tank pressure regulating valve and said fuel tank, said abnormality detecting device comprising:

a pressure reducing module for reducing a pressure in said canister to a pressure which is lower than the atmospheric pressure in the condition where a valve closing command signal for said bypass valve is output; and a diagnosing module for determining that said tank pressure regulating valve or said bypass valve is abnormal when the pressure detected by said pressure sensor becomes equal to or less than a predetermined threshold during execution of the pressure reduction by said pressure reducing module.

8. An abnormality detecting device according to claim 7, wherein said tank pressure regulating valve comprises a positive-pressure valve which opens when the pressure in said fuel tank is higher than the atmospheric pressure by a first predetermined pressure or more, and a negative-pressure valve which opens when the pressure in said fuel tank is lower than the pressure in said canister by a second predetermined pressure or more; and said diagnosing module determines that said bypass valve has failed or that said tank pressure regulating valve has been improperly mounted, when the pressure detected by said pressure sensor becomes equal to or less than the predetermined threshold during execution of the pressure reduction by said pressure reducing module.

9. An abnormality detecting device according to claim 7, wherein said diagnosing module executes the determination when a predetermined waiting period has elapsed from the time of starting the pressure reduction by said pressure reducing module.

10. An abnormality detecting device according to claim 7, wherein the predetermined threshold is set to a value which is lower than the atmospheric pressure by a predetermined determination pressure.

11. An abnormality detecting device according to claim 7, wherein said diagnosing module determines that said tank pressure regulating valve or said bypass valve is abnormal, when the condition where the pressure detected by said pressure sensor is less than or equal to the predetermined threshold continues for a predetermined determination period.

12. An abnormality detecting device for an evaporative fuel processing system including:

a fuel tank;

a canister for trapping evaporative fuel generated in said fuel tank;

a charging passage for connecting said fuel tank and said canister;

an on-off valve provided in said charging passage for opening and closing said charging passage;

and a pressure sensor provided in said fuel tank or in said charging passage at a position between said on-off valve and said fuel tank, said abnormality detecting device comprising:

a pressure reducing module for reducing a pressure in said canister to a pressure lower than an atmospheric pressure in the condition where a valve closing command signal for said on-off valve is output; and a diagnosing module for determining that said on-off valve has failed, when the pressure detected by said pressure sensor becomes equal to or less than a predetermined threshold during execution of the pressure reduction by said pressure reducing module.

13. A computer program for causing a computer to carry out an abnormality detecting method for an evaporative fuel processing system including:

a fuel tank;

a canister for trapping evaporative fuel generated in said fuel tank;

a charging passage for connecting said fuel tank and said canister;

a tank pressure regulating valve provided in said charging passage;

a bypass passage bypassing said tank pressure regulating valve;

a bypass valve provided in said bypass passage;

and a pressure sensor provided in said fuel tank or in said charging passage at a position between said tank pressure regulating valve and said fuel tank, said abnormality detecting method comprising the steps of:

a) reducing a pressure in said canister to a pressure which is lower than the atmospheric pressure in the condition where a valve closing command signal for said bypass valve is output;

b) detecting a pressure by said pressure sensor; and c) determining that said tank pressure regulating valve or said bypass valve is abnormal, when the detected pressure becomes equal to or less than a predetermined threshold during execution of the pressure reduction in said canister.

14. A computer program according to claim 13, wherein said tank pressure regulating valve comprises a positive-pressure valve which opens when the pressure in said fuel tank is higher than the atmospheric pressure by a first predetermined pressure or more, and a negative-pressure valve which opens when the pressure in said fuel tank is lower than the pressure in said canister by a second predetermined pressure or more; and it is determined that said bypass valve has failed or that said tank pressure regulating valve has been improperly mounted, when the pressure detected by said pressure sensor becomes equal to or less than the predetermined threshold during execution of the pressure reduction.

15. A computer program according to claim 13, wherein the determination is executed when a predetermined waiting period has elapsed from the time of starting the pressure reduction by said pressure reducing means.

16. A computer program according to claim 13, wherein the predetermined threshold is set to a value which is lower than the atmospheric pressure by a predetermined determination pressure.

17. A computer program according to claim 13, wherein it is determined that said tank pressure regulating valve or said bypass valve is abnormal, when the condition where the pressure detected by said pressure sensor is less than or equal to the predetermined threshold continues for a predetermined determination period.

18. A computer program for causing a computer to carry out an abnormality detecting method for an evaporative fuel processing system including:

a fuel tank;

a canister for trapping evaporative fuel generated in said fuel tank;

a charging passage for connecting said fuel tank and said canister;

an on-off valve provided in said charging passage for opening and closing said charging passage;

and a pressure sensor provided in said fuel tank or in said charging passage at a position between said on-off valve and said fuel tank, said abnormality detecting method comprising the steps of:

a) reducing a pressure in said canister to a pressure lower than an atmospheric pressure in the condition where a valve closing command signal for said on-off valve is output;

b) detecting a pressure by said pressure sensor; and c) determining that said on-off valve has failed, when the detected pressure becomes equal to or less than a predetermined threshold during execution of the pressure reduction in said canister.

* * * * *